(12) United States Patent
Leturcq

(10) Patent No.: US 6,244,600 B1
(45) Date of Patent: Jun. 12, 2001

(54) LEAKTIGHT FITTING FOR A SHAFT END

(75) Inventor: Michel Marie Maurice Leturcq, Rueil Malmaison (FR)

(73) Assignee: Societe Hispano Suiza, Paris (FR)

( * ) Notice: Subject to any disclaimer, the term of this patent is extended or adjusted under 35 U.S.C. 154(b) by 0 days.

(21) Appl. No.: 09/127,972

(22) Filed: Aug. 4, 1998

(30) Foreign Application Priority Data

Aug. 13, 1997 (FR) .................................................. 97 10313

(51) Int. Cl.$^7$ ....................................................... F16J 15/32
(52) U.S. Cl. ........................... 277/353; 277/549; 277/551
(58) Field of Search .................................. 277/353, 370, 277/510, 530, 531, 549, 550, 551, 589, 616, FOR 100, FOR 119

(56) References Cited

U.S. PATENT DOCUMENTS

| 2,405,120 | * | 8/1946 | Evans . |
| 3,788,100 | * | 1/1974 | Pitner .............................. 277/353 X |
| 4,587,749 | | 5/1986 | Berlese . |
| 4,664,392 | | 5/1987 | Hatch . |
| 5,024,449 | * | 6/1991 | Otto . |
| 5,299,811 | * | 4/1994 | Kershaw . |
| 5,605,337 | | 2/1997 | Puri . |
| 5,791,658 | * | 8/1998 | Johnston . |
| 6,050,572 | * | 4/2000 | Balsells et al. . |

FOREIGN PATENT DOCUMENTS

| 34 21 247 | 12/1984 | (DE) . |
| 0 561 565 | 9/1993 | (EP) . |

* cited by examiner

Primary Examiner—Robert J. Sandy
Assistant Examiner—Karlena D. Schwing
(74) Attorney, Agent, or Firm—Oblon, Spivak, McClelland, Maier & Neustadt, P.C.

(57) ABSTRACT

The present invention relates to a leaktight seal with a lip capable of gripping a shaft end and being fitted behind a cap. When the cap is in place covering the shaft end and closing the housing, it presses on a stop flange of seal and pushes the lip outwards so that the rotation of the shaft end causes no wear on the seal. When the cap is removed, the housing remains open but the lip grips the shaft end and restores the leaktight seal. This fitting is of particular use for shaft ends fitted with a key slot used for manually rotating a rotating machine during the inspection phase of servicing, the shaft end being driven during normal use of the machine.

10 Claims, 2 Drawing Sheets

LEAKTIGHT FITTING FOR A SHAFT END

BACKGROUND OF THE INVENTION

1. Field of the Invention

The present invention relates to a leaktight fitting for a shaft end, particularly for a shaft end located in a housing and protected from the outside by a cap that can be removed when required.

2. Discussion of the Background

The advantages of this type of shaft end may be understood by studying FIG. 1 which shows a gas turbine. Working from front to back along an annular gas circulation channel 1, are fitted a blower 2, a low pressure compressor 3, a high pressure compressor 4, a combustion chamber 5, a high pressure turbine 6 and a low pressure turbine 7. The channel 1 contains fixed, circular blade stages constructed as part of a housing 8 that delimits the outside of the channel and rotating blades connected to a rotor 9 that delimit the inside of the channel. The rotor 9 also comprises a line of low pressure shafts 10 that interconnect the blower 2, the low pressure compressor 3 and the low pressure turbine 7, as well as a line of high pressure shafts 11 that interconnect the high pressure compressor 4 and the high pressure turbine 6. The lines of shafts 10 and 11 are coaxial and the line of high pressure shafts 11 surrounds the line of low pressure shafts 10. The line of shafts ends at the front in a conical gear wheel that co-ordinates with a first conical gear wheel of a transmission shaft 12 radially positioned to form an angled gear 13. Another angled gear 14 is formed at the opposite end of transmission shaft 12 between another conical gear wheel mounted on the shaft and a final conical gear wheel located at the rear end of shaft end 15. Shaft end 15 lies parallel to the shaft lines 10 and 11 and next to the low pressure compressor 3 and the blower 2. Its forward end finishes behind a plane surface 16 of housing 8, opposite an aperture 17 that is closed by a cap 18 gripped by an elastic ring 19 clamped between the cap and aperture 17. This ring 19 also ensures the leaktightness of aperture 17.

The shaft end 15 allows individual inspection of the blades connected to the line of high pressure shafts 11 and particularly the blades of the high pressure compressor 4. It is known that blades are relatively fragile structures that can be easily damaged, for example when a foreign body is introduced into the gas turbine. The method for inspecting the blades consists firstly in disassembling the gas turbine and opening a window of housing 8 facing one of the stages of the rotating blades to be inspected, usually the first of compressor 4, and then rotating the line of high pressure shafts 11 in order that all the blades of the stage pass successively in front of the window. Movement is brought about using a key (not shown, but of standard design) which is inserted into an opening located at the front of shaft end 15. The key is inserted through slot 17 once the cap 18 is removed and can be operated by hand or by a dedicated device. A drawback, however, of this construction is that the operator may forget to replace cap 18, resulting in a large quantity of the oil contained in housing 8 draining from aperture 17 as soon as operation of the gas turbine is resumed, thus rapidly emptying the housing 8. Despite seal 19, cap 18 may also be accidentally dropped.

SUMMARY OF THE INVENTION

The present invention was designed to combat this risk. It consists in adding a leaktight seal between shaft end 15 and housing 8 in order to maintain leaktightness even when cap 18 is removed.

It should, however, be pointed out that the shaft end 15 rotates with the line of high pressure shafts 11 while the gas turbine is in use and is likely to cause rapid wear of the recently-added joint. The major contribution of the invention to the art therefore consists of the special construction of the added leaktight seal and of the cap designed to overcome this difficulty.

In its commonest form the invention therefore relates to a leaktight fitting for a shaft end fitted behind a movable cap on an aperture in the housing of the shaft end, characterized by the fact that it comprises a leaktight seal fastened to the housing, located between the housing and the shaft end and comprising an elastic lip tending to rest on the shaft end, and by the fact that the cap comprises a pusher component lying around the shaft end and pushing the elastic lip of the shaft end when the cap is placed on the aperture.

BRIEF DESCRIPTION OF THE DRAWINGS

The special characteristics, aims and advantages of the invention will be better understood from the description of the attached figures where.

DESCRIPTION OF THE PREFERRED EMBODIMENTS

Figure 1:
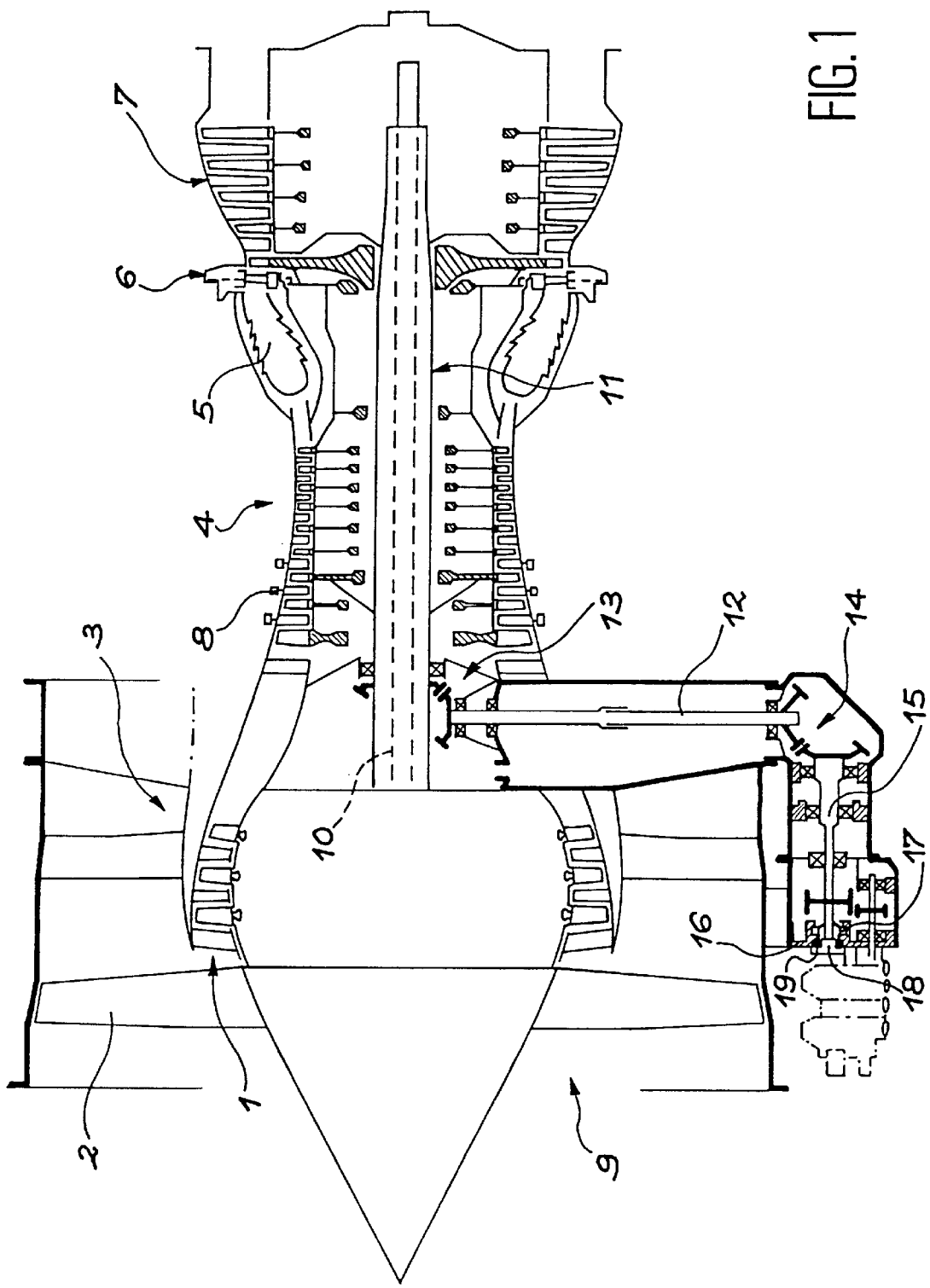
FIG. 1 (described above) shows a gas turbine fitted with a shaft end to which the invention may be fitted.
Figure 2:
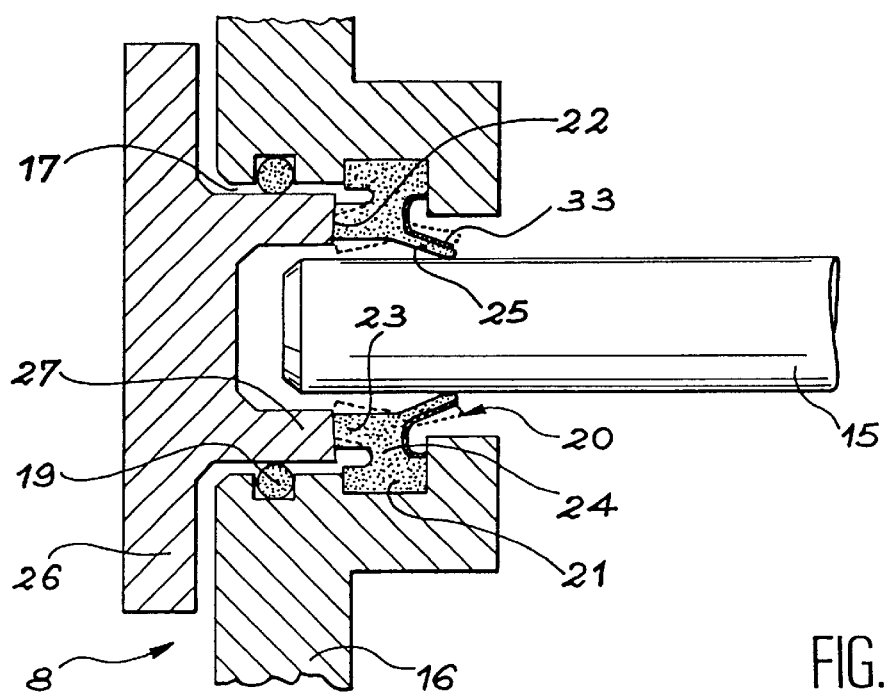
FIG. 2 shows a first embodiment of the invention.

Seal 20 added with the invention and shown in FIG. 2 comprises a retaining strip 21 that is set into a groove 22 in the housing 8, a stop flange 23 connected to the retaining strip 21 by necking 24, and a conical lip 25 whose diameter reduces towards the inside of the housing and which is connected to the stop flange 23. The narrowest edge of lip 25 (i.e. facing the stop flange 23) rubs against shaft end 15 when the cap is absent. The housing 8 thus remains satisfactorily leaktight even without the cap.

The inner surface of cap 26 modified according to the invention comprises a cylindrical pusher component 27 that encloses the shaft end 15 and presses against stop flange 23. When the cap 26 presses against the surface 16 of the housing, the pusher 27 forces the stop flange 23 towards the inside of the housing 8 and since necking 24 acts as a hinge, the stop flange 23 and the lip 25 are subjected to a slight rotation that causes lip 25 to open, thereby acquiring a slightly larger diameter and causing its free end to distort and detach from the shaft end 15 as shown by the dotted lines. The machine may thus be operated without the rotating shaft end 15 rubbing against lip 25 that is only subject to wear if the cap 26 has been left off or accidentally dropped.

When compressed, the O-ring 19 also acts as a standard-type seal between the plane surface 16 of housing 8 and cap 26.

Figure 3:
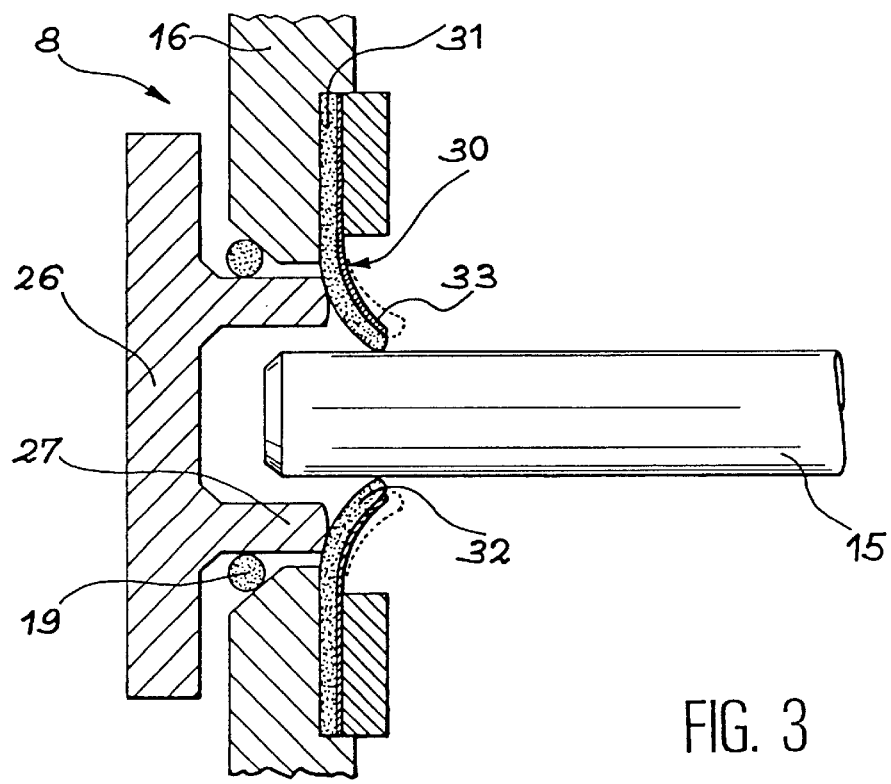
FIG. 3 shows a second embodiment of the invention.

FIG. 3 shows another embodiment. The seal, here numbered 30, is simpler than seal 20 above. It is, in fact, a disk whose center has been cut out; its flat outer section 31 enables it to be set it into housing 8 SO that its lower part can bend inwards into the housing, once again acting as a lip 32 whose edge is in contact with shaft end 15 when at rest. As before, the pusher 27 of cap 26 presses on lip 32 when it is installed, opening it and freeing it from shaft end 15, again as shown by dotted lines. In contrast with the previous embodiment in which seal 20 was located towards the outside of plane surface 16, this seal is located on the inside.

The seal 20 or 30 must be constructed either of elastomer or a material that is both elastic and flexible enough to be subjected to adequate temporary deflection. The material used may also be, for example, PTFE.

Once specialists in the trade have understood the operating principle behind the invention, they will easily find other suitable embodiments. We would simply point out that lip 25 or 32 may be strengthened by means of a metallic core to stiffen it without reducing its elasticity. This type of core 33 is shown in FIGS. 2 and 3. In this particular embodiment, a strip is used to line the lip 32, which is turned inwards into the housing. As is well known in the art, this type of metallic spring may be replaced by others.

What is claimed is:

1. A leaktight fitting in combination with a shaft end, comprising:
   a removable cap covering an aperture in a housing in which the shaft end is housed,
   a pushing component projecting from the cap and extending into the housing,
   a seal located in the housing and comprising an elastic lip extending towards the shaft end,
   the pushing component engaging the seal for pushing the elastic lip off the shaft end so as to be detached therefrom such that an opening is provided between the elastic lip and the shaft,
   the lip sealingly engaging the shaft end upon removal of the cap.

2. Leaktight fitting of claim 1 wherein the seal is substantially flat when at rest.

3. Leaktight fitting of claim 1 wherein the seal comprises a retaining strip that is set into the housing and a stop flange hinged at the retaining strip and directed towards the cap, the lip being conical and reducing in size remote from the cap and being connected to the stop flange.

4. Leaktight fitting of claim 1 wherein the lip comprises an elastomeric lip.

5. Leaktight fitting of claim 1 wherein the lip comprises PTFE.

6. Leaktight fitting of claim 1 which comprises a metallic spring for reinforcing the lip.

7. The leaktight fitting of claim 1, wherein a portion of the elastic lip comprises a substantially flat shaped elastic lip upon sealingly engaging the shaft end, a remaining portion of said elastic lip being bendable by the pushing component.

8. The leaktight fitting of claim 1, wherein said pushing component is spaced from the shaft.

9. The leaktight fitting of claim 8, wherein said pushing component extends in a direction substantially parallel to a longitudinal axis of the shaft.

10. The leaktight fitting of claim 1, wherein said pushing component engages the seal at an end thereof opposite the elastic lip.

* * * * *